(12) United States Patent
Jelinek

(10) Patent No.: US 9,464,540 B2
(45) Date of Patent: Oct. 11, 2016

(54) TRANSFER ASSEMBLY FOR A MECHANICALLY CONTROLLABLE VALVE TRAIN

(71) Applicant: PIERBURG GMBH, Neuss (DE)

(72) Inventor: Dieter Jelinek, Kaarst (DE)

(73) Assignee: PIERBURG GMBH, Neuss (DE)

( * ) Notice: Subject to any disclaimer, the term of this patent is extended or adjusted under 35 U.S.C. 154(b) by 86 days.

(21) Appl. No.: 14/562,786

(22) Filed: Dec. 8, 2014

(65) Prior Publication Data

US 2015/0159519 A1    Jun. 11, 2015

(30) Foreign Application Priority Data

Dec. 11, 2013 (DE) .................. 10 2013 113 815

(51) Int. Cl.
| | | |
|---|---|---|
| *F01L 1/34* | (2006.01) | |
| *F01L 1/12* | (2006.01) | |
| *F16K 1/54* | (2006.01) | |
| *F16K 31/524* | (2006.01) | |
| *F01L 13/00* | (2006.01) | |

(52) U.S. Cl.
CPC .............. *F01L 1/12* (2013.01); *F01L 13/0021* (2013.01); *F16K 1/54* (2013.01); *F16K 31/52441* (2013.01)

(58) Field of Classification Search
CPC ................................ F01L 1/12; F01L 13/0021
USPC ................................ 123/90.16, 90.39, 90.44
See application file for complete search history.

(56) References Cited

U.S. PATENT DOCUMENTS

| | | |
|---|---|---|
| 5,373,818 A | 12/1994 | Unger |
| 6,792,903 B2 * | 9/2004 | Morrn ................. F01L 13/0021 123/90.15 |
| 2004/0147356 A1 | 7/2004 | Baxter, Jr. et al. |
| 2011/0023801 A1 | 2/2011 | Berger et al. |

FOREIGN PATENT DOCUMENTS

| | | |
|---|---|---|
| DE | 31 15 422 A1 | 11/1982 |
| DE | 42 35 620 A1 | 4/1994 |
| DE | 695 13 165 T2 | 6/2000 |
| DE | 100 12 400 A1 | 9/2001 |
| DE | 102 58 277 A1 | 6/2004 |
| DE | 10 2004 003 324 A1 | 8/2004 |
| DE | 10 2004 040 652 A1 | 2/2006 |
| DE | 10 2009 035 404 A1 | 2/2011 |
| EP | 0 638 706 A1 | 2/1995 |
| EP | 1 760 278 A2 | 3/2007 |
| JP | 2007-127090 A | 5/2007 |

* cited by examiner

*Primary Examiner* — Ching Chang
(74) *Attorney, Agent, or Firm* — Norman B. Thot

(57) ABSTRACT

A transfer assembly for a mechanically controllable valve train includes a transfer member in which a valve lift adjusting device is integrated. The transfer member is configured to be operatively connected to at least one gas exchange valve directly or indirectly via a coupling element, to be movably supported in a cylinder head via a bearing, and to be operatively connected to a camshaft and to the valve lift adjusting device so that different maximum lifts of the gas exchange valve can be set.

8 Claims, 3 Drawing Sheets

TRANSFER ASSEMBLY FOR A MECHANICALLY CONTROLLABLE VALVE TRAIN

CROSS REFERENCE TO PRIOR APPLICATIONS

Priority is claimed to German Patent Application No. DE 10 2013 113 815.2, filed Dec. 11, 2013. The entire disclosure of said application is incorporated by reference herein.

FIELD

The present invention relates to a transfer assembly for a mechanically controllable valve train, comprising a transfer member which is configured so that it is operatively connected to at least one gas exchange valve directly or indirectly via a coupling means and which is movably supported in the cylinder head via a bearing means, the transfer member further being operatively connected to a camshaft and a valve lift adjusting device so that at least various maximum lifts of the gas exchange valve are adapted to be set. The present invention also relates to a mechanically controllable valve train having such a transfer assembly.

BACKGROUND

Transfer assemblies and/or mechanically controllable valve trains have previously been described. EP 638706 A1 describes a valve train assembly where an eccentric shaft rotatably supported in a cylinder head is provided for controlling and/or regulating the valve lift, the eccentric shaft acting upon the transfer assembly so that valve lifts between 0 and maximum can be set in a simple manner. The combustion process can thereby be well adapted to the respective operating state of the internal combustion engine. DE 10 2004 003 324 A1 describes that adjusting members are provided in a valve train assembly which can be adjusted independently of each other for the purpose of stopping individual cylinders during certain operational states. EP 1 760 278 A2 describes a valve train which has an eccentric member comprising various curve shapes, in particular for a partial lift and for a full lift.

DE 102 58 277 A1 describes a transfer assembly whose transfer member is operatively connected to the camshaft and which is adjustable via a valve lift adjusting device which is not an eccentric shaft.

All of the above valve trains are provided with a transfer assembly which is operatively connected to a camshaft and to a valve lift adjusting device to set at least various maximum lifts of a gas exchange valve. Irrespective of the arrangement of the transfer assembly relative to the camshaft and the valve lift adjusting device, such a type of valve train in any case requires a large installation space which is not available in the engine compartment. The kinematic coupling of the transfer member with the camshaft, the adjusting device, and the gas exchange valve further leads to wear and friction losses.

SUMMARY

An aspect of the present invention is to provide a transfer assembly and/or a mechanically controllable valve train which eliminates and/or minimizes the aforementioned drawbacks in a simple and inexpensive manner.

In an embodiment, the present invention provides a transfer assembly for a mechanically controllable valve train which includes a transfer member in which a valve lift adjusting device is integrated. The transfer member is configured to be operatively connected to at least one gas exchange valve directly or indirectly via a coupling element, to be movably supported in a cylinder head via a bearing, and to be operatively connected to a camshaft and to the valve lift adjusting device so that different maximum lifts of the gas exchange valve can be set. Such a transfer device requires a considerably smaller installation space than conventional transfer assemblies. Points of contact with external assemblies can also be reduced in a simple manner so as to minimize friction losses.

BRIEF DESCRIPTION OF THE DRAWINGS

The present invention is described in greater detail below on the basis of embodiments and of the drawings in which.

DETAILED DESCRIPTION

In an embodiment of the present invention, a profile rod element having a work curve can, for example, be provided as a coupling means which is operatively connected to a rocker arm of the gas exchange valve. Such a profile rod element provides a particularly compact design of the transfer assembly. A supporting roller member may be provided as a bearing means or element which engages the side of the profile rod element opposite to the work curve.

The transfer member can, for example, be configured as an actuator with a housing portion for the profile rod element. It is here particularly advantageous when the actuator comprises a plunger element adjustable in the longitudinal direction of the transfer member, wherein the plunger element is biased with respect to the camshaft by at least one spring element. It may also be advantageous when the actuator is configured as a hydraulic actuator. The plunger element can, for example, be configured as a piston or a roller plunger. The plunger element may alternatively be configured as a thread-guided rotary plunger or a ramp-guided rotary plunger.

In an embodiment, the present invention provides a mechanically controllable valve train having the a transfer assembly, wherein a gas exchange valve is associated with a transfer assembly. It is thereby possible to control each individual gas exchange valve independent of the other gas exchange valves. A particularly compact and inexpensive embodiment of a mechanical valve train is obtained when at least two series-connected gas exchange valves are associated with a transfer assembly.

The present invention will be described in detail below with reference to the drawings.

Figure 1:
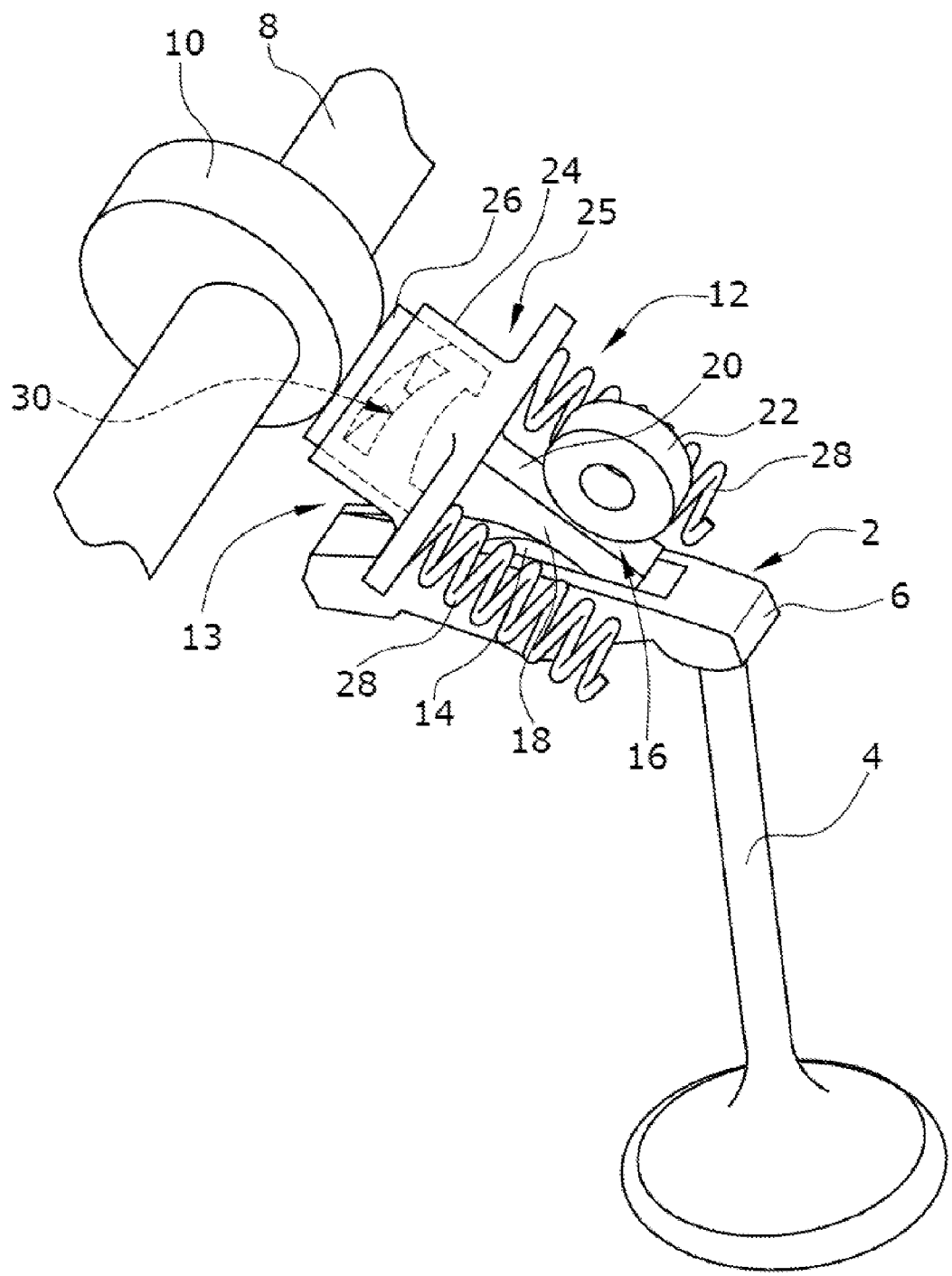
FIG. 1 shows a perspective view of a mechanical valve train for a gas exchange valve according to the present invention.

FIG. 1 shows a perspective view of a mechanically controllable valve train 2 according to the present invention. A gas exchange valve 4 which may be configured both as a gas inlet and a gas outlet valve is connected to a rocker arm 6 in a known manner. A camshaft 8 is also provided which, in the present case, acts upon a transfer assembly 12 via a cam 10, the transfer assembly 12, in turn, being configured so that it is operatively connected to a roller 14 of the rocker arm 6 so that a rotation of the camshaft 8 triggers a lifting movement of the gas exchange valve 4.

The transfer assembly 12 includes a transfer member 13 which comprises a profile rod element 16 as a coupling, the profile coupling element 16 including a work curve 18 which is operatively connected to the roller 14 of the rocker arm 6 in a known manner. On the side 20 opposite to the work curve 18 a supporting roller member 22 engages via which the transfer assembly 12 is supported in a cylinder head (not shown). The transfer assembly 12 also comprises a housing portion 24 which is configured as a valve lift adjusting device and thus as an actuator 25 for the profile rod element 16. For this purpose, the housing portion 24 comprises a plunger element 26 which is adjustable in the longitudinal direction of the transfer member 13 according the illustrated embodiment (see FIG. 2). In the illustrated embodiment, the housing portion 24 and thus the plunger element 26 are biased by two spring elements 28 with respect to the camshaft 8 and thus with respect to the cam element 10. In the illustrated embodiment, the actuator 25 is configured as a hydraulic actuator. The plunger element 26 is here configured as a piston. It is also conceivable, however, to use a roller plunger for this purpose.

Figure 2:
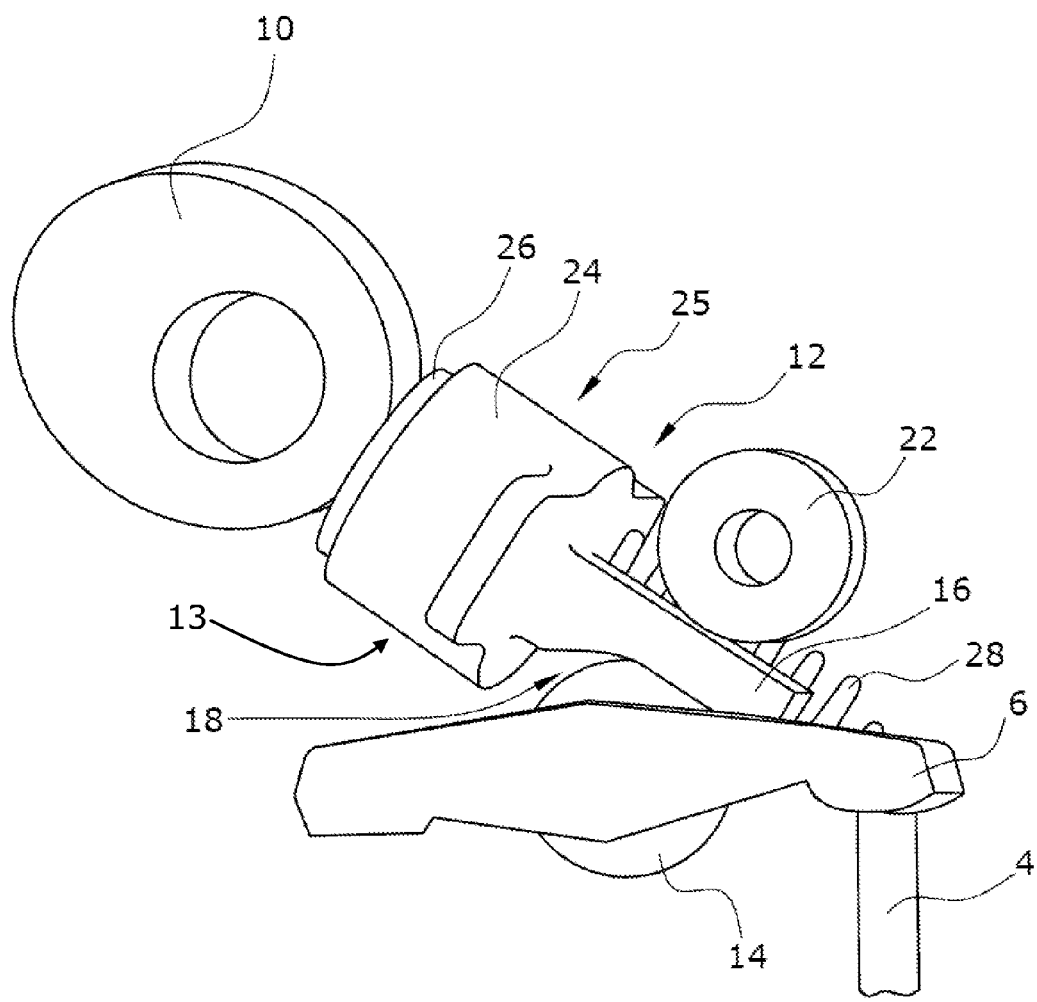
FIG. 2 shows a perspective side view of a transfer assembly of the mechanical valve train of FIG. 1 according to the present invention.

FIG. 2 shows a side view of the transfer assembly 12 of FIG. 1. The profile rod element 16 is clearly shown whose work curve 18 engages the roller 14 of the rocker arm 6. The housing portion 24 is here shown as a transparent housing portion so that an inward thread 30 is visible by means of which the piston-shaped plunger element 26 is guided. The actuator 25 may be connected to a high-pressure oil reservoir (not shown) and thus be adjusted so that lifts from 0 to maximum of the gas exchange valve 4 can be provided. Other drive configurations of the actuator 25 are, of course, also conceivable.

Figure 3:
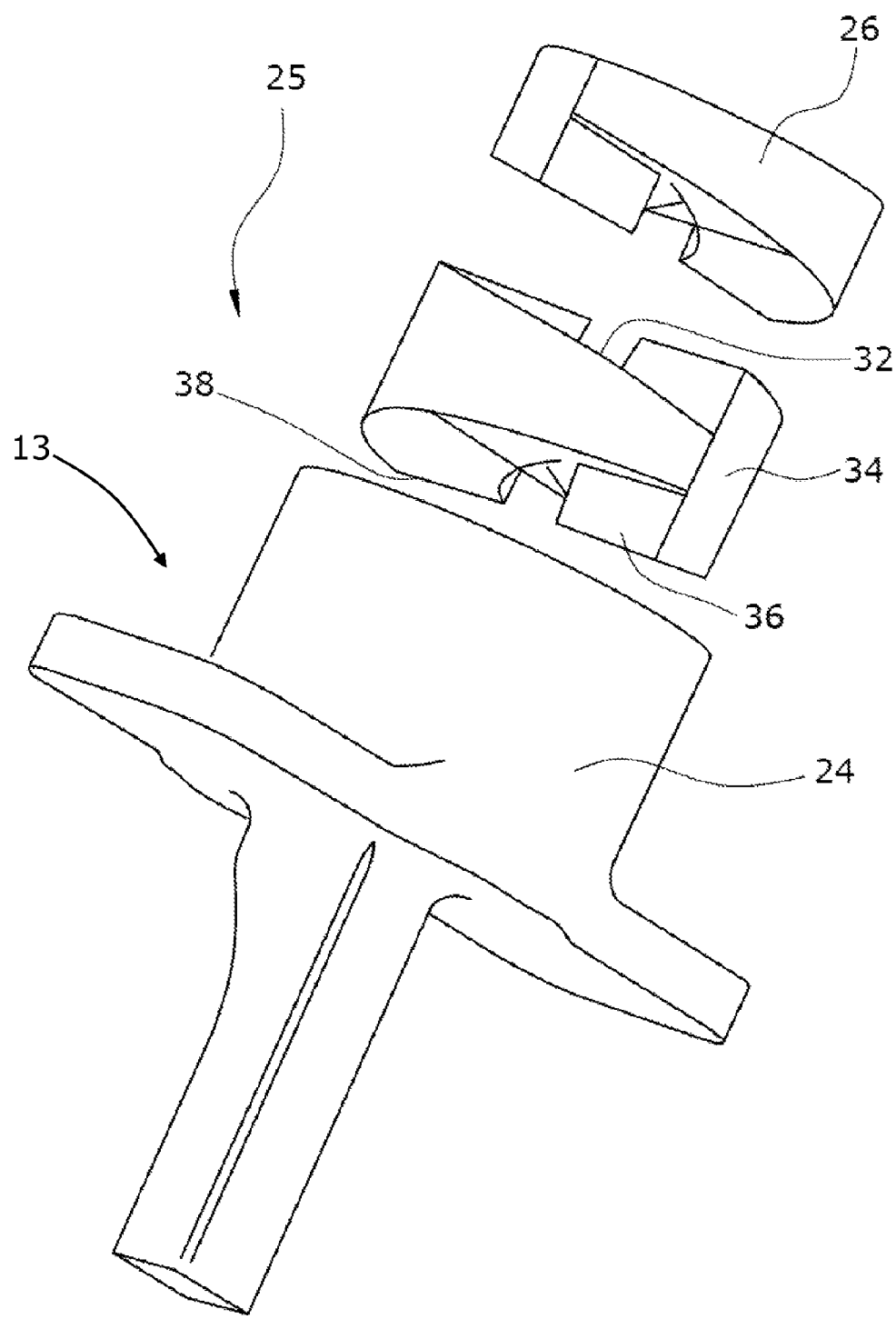
FIG. 3 shows a perspective exploded view of an embodiment of an actuator of the transfer assembly.

FIG. 3 shows a perspective exploded view of an embodiment of the actuator 25. The plunger element 26 is here mechanically or hydraulically guided on a ramp 32. The ramp 32 is configured at an intermediate element 34 which is supported in a form-fit manner in the housing portion 24 using projections 36, 38 in a known manner. The ramp 32 may, of course, also be directly provided in the housing portion 24.

Although the present invention has been described and illustrated with reference to specific embodiments, it is not intended that the present invention be limited thereto. Those skilled in the art will recognize that variations and modifications can be made without departing from the true scope of the present invention as defined by the claims. It is therefore intended to include within the present invention all such variations and modifications as fall within the scope of the appended claims and equivalents thereof.

What is claimed is:

1. A transfer assembly for a mechanically controllable valve train, the transfer assembly comprising at least one spring element and a transfer member in which a valve lift adjusting device is integrated, the transfer member being configured:
   to be operatively connected to at least one gas exchange valve directly or indirectly via a coupling element;
   to be movably supported in a cylinder head via a bearing; and
   to be operatively connected to a camshaft and to the valve lift adjusting device so that different maximum lifts of the gas exchange valve can be set,
   wherein,
   the at least one gas exchange valve comprises a rocker arm,
   the coupling element is provided as a profile rod element comprising a working curve, the profile rod element being configured to be operatively connected to the rocker arm,
   the transfer member is provided as an actuator comprising a housing portion for the profile rod element, the actuator comprising a plunger element which is configured to be adjustable in a longitudinal direction of the transfer member, and
   the at least one spring element being configured to bias the plunger element with respect to the camshaft.

2. The transfer assembly as recited in claim 1, wherein the bearing is provided a supporting roller member which is configured to engage a side of the profile rod element arranged opposite to the working curve.

3. The transfer assembly as recited in claim 1, wherein the actuator is a hydraulic actuator.

4. The transfer assembly as recited in claim 1, wherein the plunger element is a piston or a roller plunger.

5. The transfer assembly as recited in claim 1, wherein the plunger element is a thread-guided rotary plunger.

6. The transfer assembly as recited in claim 1, wherein the plunger element is a ramp-guided rotary plunger.

7. A mechanically controllable valve train comprising the transfer assembly as recited in claim 1, wherein one gas exchange valve is associated with the transfer assembly.

8. A mechanically controllable valve train comprising the transfer assembly as recited in claim 1, wherein at least two series-connected gas exchange valves are associated with the transfer assembly.

* * * * *